(12) United States Patent
Ishioka et al.

(10) Patent No.: US 11,673,843 B2
(45) Date of Patent: Jun. 13, 2023

(54) HONEYCOMB STRUCTURE

(71) Applicant: NGK Insulators, Ltd., Nagoya (JP)

(72) Inventors: Tomohiro Ishioka, Kurashiki (JP); Kazuya Yuki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 308 days.

(21) Appl. No.: 17/070,229

(22) Filed: Oct. 14, 2020

(65) Prior Publication Data
US 2021/0171404 A1    Jun. 10, 2021

(30) Foreign Application Priority Data

Dec. 5, 2019   (JP) .............................. JP2019-220596

(51) Int. Cl.
*C04B 38/00*  (2006.01)
*B01D 46/24*  (2006.01)
*B01D 53/94*  (2006.01)
*B01J 35/04*  (2006.01)

(52) U.S. Cl.
CPC ...... *C04B 38/0016* (2013.01); *B01D 46/2455* (2013.01); *B01D 46/2462* (2013.01); *B01D 46/2476* (2021.08); *B01D 46/2478* (2021.08); *B01D 46/2482* (2021.08); *B01D 53/94* (2013.01); *B01J 35/04* (2013.01); *B01D 2255/9155* (2013.01); *B01D 2279/30* (2013.01)

(58) Field of Classification Search
None
See application file for complete search history.

(56) References Cited

U.S. PATENT DOCUMENTS

| 4,743,578 A | * | 5/1988 | Davidson | ................. B01J 35/02 |
| | | | | 428/116 |
| 2006/0191245 A1 | * | 8/2006 | Bardon | ................ F01N 3/0222 |
| | | | | 55/523 |
| 2009/0239740 A1 | * | 9/2009 | Ohno | ................. B01D 46/2484 |
| | | | | 428/116 |

FOREIGN PATENT DOCUMENTS

| JP | 2016069234 A | * | 5/2016 |
| JP | 2016-172212 A1 | | 9/2016 |

OTHER PUBLICATIONS

Machine translation of JP 2016069234 A, translated via EPO on Oct. 12, 2022. (Year: 2016).*

* cited by examiner

*Primary Examiner* — Elizabeth Collister
(74) *Attorney, Agent, or Firm* — Burr Patent Law, PLLC

(57) ABSTRACT

A honeycomb structure includes a honeycomb segment bonded member including; a plurality of prismatic columnar shaped honeycomb segments; and a bonding layer bonding the segments, wherein one honeycomb segment has a bulge on one side face, extending in an axial direction, another honeycomb segment has a recess on one side face, extending in the axial direction, the one honeycomb segment and the another are disposed adjacent and bonded to each other via the bonding layer with the bulge inserted in the recess, length of the bulge is smaller than length of the one side face of the one honeycomb segment, length of the recess is smaller than length of the one side face of the another honeycomb segment, a base part of the bulge is defined with a bent side face, an angle between an imaginary bottom face and the bent side face of the bulge being 60° or more.

4 Claims, 17 Drawing Sheets

HONEYCOMB STRUCTURE

The present application is an application based on JP 2019-220596 filed on Dec. 5, 2019 with Japan Patent Office, the entire contents of which are incorporated herein by reference.

BACKGROUND OF THE INVENTION

Field of the Invention

The present invention relates to honeycomb structures. More particularly, the present invention relates to a honeycomb structure that is used for a filter to trap particulate matters in exhaust gas or for a catalyst carrier for loading of catalyst to purify exhaust gas.

Description of the Related Art

Exhaust gas emitted from diesel vehicles and trucks contains particulate matters. Hereinafter, the particulate matters may be called "PM". "PM" stands for "Particulate Matter". This PM is mainly composed of carbon particulates such as soot. It is necessary to prevent the PM from being released into the atmosphere, and strict emission regulations are imposed.

Many studies have been conducted to reduce the amount of PM emissions in order to meet such strict emission regulations. There is, however, a limit to reducing the amount of PM emissions by improving the combustion technology, and currently effective means of reducing PM emissions is installation of a filter in the exhaust system.

As a filter to trap PM, a wall flow type filter having a honeycomb structure is widely used because it can obtain high PM trapping efficiency while suppressing the pressure loss within an allowable range. A honeycomb structure used for such a wall flow type filter has a porous partition wall that defines a plurality of cells extending from the inflow end face as the inlet side of exhaust gas to the outflow end face as the outlet side of exhaust gas. This honeycomb structure may be provided with plugging portions to plug open ends on the outflow end face side of predetermined cells and open ends on the inflow end face side of the residual cells, whereby a filter with high PM trapping efficiency can be obtained.

Recently, honeycomb structures used for a filter to trap PM may be manufactured of a material expected to have a high heat capacity in order to increase the amount of trapped PM. Such a material expected to have a high heat capacity, however, generally has a high thermal expansion property and generates high thermal stress due to thermal shock from high-temperature exhaust gas, and so the honeycomb structure may be damaged. For this reason, a honeycomb structure formed by bonding a plurality of honeycomb-shaped segments (honeycomb segments) has been proposed, instead of manufacturing a filter as one honeycomb structure (see Patent Document 1, for example). Hereinafter, such a honeycomb structure may be called a "segmented structured honeycomb structure". The segmented structured honeycomb structure is configured so that a single honeycomb structure is divided into a plurality of honeycomb segments, and so enables distribution of thermal stress generated in the honeycomb structure. In this segmented structured honeycomb structure, a bonding layer that bonds the plurality of honeycomb segments can play a role of a buffer member that relieves the thermal stress.

[Patent Document 1] JP-A-2016-172212

SUMMARY OF THE INVENTION

In the segmented structured honeycomb structure, the honeycomb segments are mutually bonded with a bonding layer. During use, a crack may occur in the bonding layer itself due to stress relaxation in the honeycomb segments and because excessive thermal stress is applied. If such a crack in the bonding layer spreads over a wide range, the crack may penetrate through the entire region in the through channel direction. This may lead to a failure to hold the honeycomb segments, so that some of the honeycomb segments may be separated. The separated honeycomb segments then may be pushed out to the downstream side due to the wind pressure of exhaust gas, for example, and may fall out of the honeycomb structure. When such an accident happens, a problem may occur, such as physically damage of a post-treatment system in the exhaust gas purifying system disposed downstream side of the honeycomb structure.

In view of such problems of the conventional techniques, the present invention provides a honeycomb structure capable of, when a crack occurs in the bonding layer, preventing the crack from penetrating through the entire region in the through channel direction of the honeycomb structure, and so effectively suppressing separation of the honeycomb segments due to the crack.

The present invention provides the following honeycomb structure.

According to a first aspect of the present invention, a honeycomb structure is provided including a honeycomb segment bonded member including; a plurality of prismatic columnar shaped honeycomb segments; and a bonding layer mutually bonding side faces of the plurality of honeycomb segments, wherein the honeycomb segments have a porous partition wall disposed so as to surround a plurality of cells extending from a first end face as an inlet side of fluid and a second end face as an outlet side of the fluid; and a segment outer wall defining side faces of the honeycomb segment, one honeycomb segment out of the plurality of honeycomb segments has at least one bulge that bulges outward on one side face of the one honeycomb segment, the at least one bulge is provided so as to start from either the first end face or the second end face in an axial direction from the first end face to the second end face of the one honeycomb segment and extend in the axial direction, another honeycomb segment out of the plurality of honeycomb segments has at least one recess that is recessed inward on one side face of the another honeycomb segment, the at least one recess is provided so as to start from either the first end face or the second end face in an axial direction from the first end face to the second end face of the another honeycomb segment and extend in the axial direction, in the honeycomb segment bonded member, the one honeycomb segment and the another honeycomb segment are disposed adjacent to each other so that their one side faces are opposed to each other, and bonded to each other via the bonding layer with the bulge of the one honeycomb segment inserted in the recess of the another honeycomb segment, length W2 of the bulge in a width direction orthogonal to the axial direction and a bulging height direction of the bulge is smaller than length W1 of the one side face of the one honeycomb segment in the width direction, length W4 of the recess in a width direction orthogonal to the axial direction and a recessing direction of the recess is smaller than length W3 of the one side face of the another honeycomb segment in the width direction, a base part in the bulging height direction of the bulge is defined with a bent side face that is bent from a flat portion of the one side face, angle θ1 formed between an imaginary bottom face of the bulge, which includes a plane imaginarily extending from the flat portion of the one side face, and the bent side face of the bulge being 60° or more.

According to a second aspect of the present invention, the honeycomb structure according to the first aspect is provided, wherein the bulge of the one honeycomb segment has bulging height H2 that bulges from the one side face of the bulge, and the bulging height H2 is larger than a maximum thickness H1 of the bonding layer between the one side faces of the one honeycomb segment and the another honeycomb segment.

According to a third aspect of the present invention, the honeycomb structure according to the first or second aspect is provided, wherein the recess of the another honeycomb segment has a depth H4 of the recess, and the depth H4 is smaller than a thickness of the segment outer wall defining the side faces of the another honeycomb segment, so that the recess does not penetrate through the segment outer wall.

According to a fourth aspect of the present invention, the honeycomb structure according to any one of the first to third aspects is provided, wherein length W2 of the bulge in the width direction is 20 to 70% of length W1 of the one side face of the one honeycomb segment in the width direction, and length W4 of the recess in the width direction is 20 to 70% of length W3 of the one side face of the another honeycomb segment in the width direction.

According to a fifth aspect of the present invention, the honeycomb structure according to any one of the first to fourth aspects is provided, wherein length L2 of the bulge in the axial direction is 5 to 50% of length L1 of the one honeycomb segment in the axial direction, and length L4 of the recess in the axial direction is 5 to 50% of length L3 of the another honeycomb segment in the axial direction.

A honeycomb structure of the present invention is capable of, when a crack occurs in the bonding layer, preventing the crack from penetrating through the entire region in the through channel direction of the honeycomb structure as compared with conventional segmented structured honeycomb structures, and so effectively suppressing separation of the honeycomb segments due to cracks. Further, if a crack occurs in the bonding layer and some of the honeycomb segments are separated, the honeycomb structure of the present invention prevents the separated honeycomb segments from falling off to the downstream.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

Figure 1:
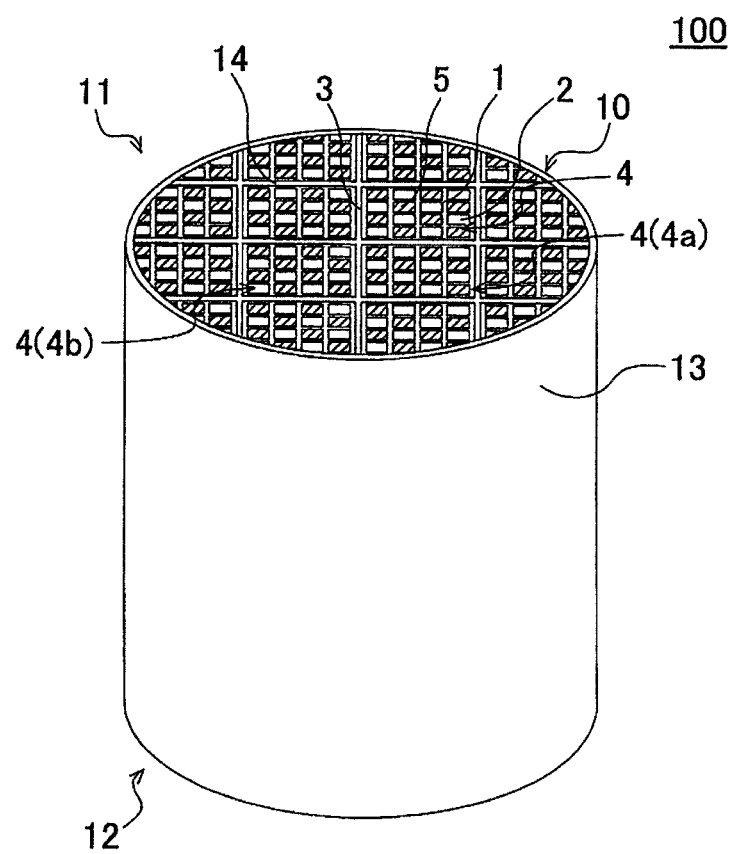
FIG. 1 is a perspective view schematically showing a first embodiment of the honeycomb structure of the present invention.
Figure 2:
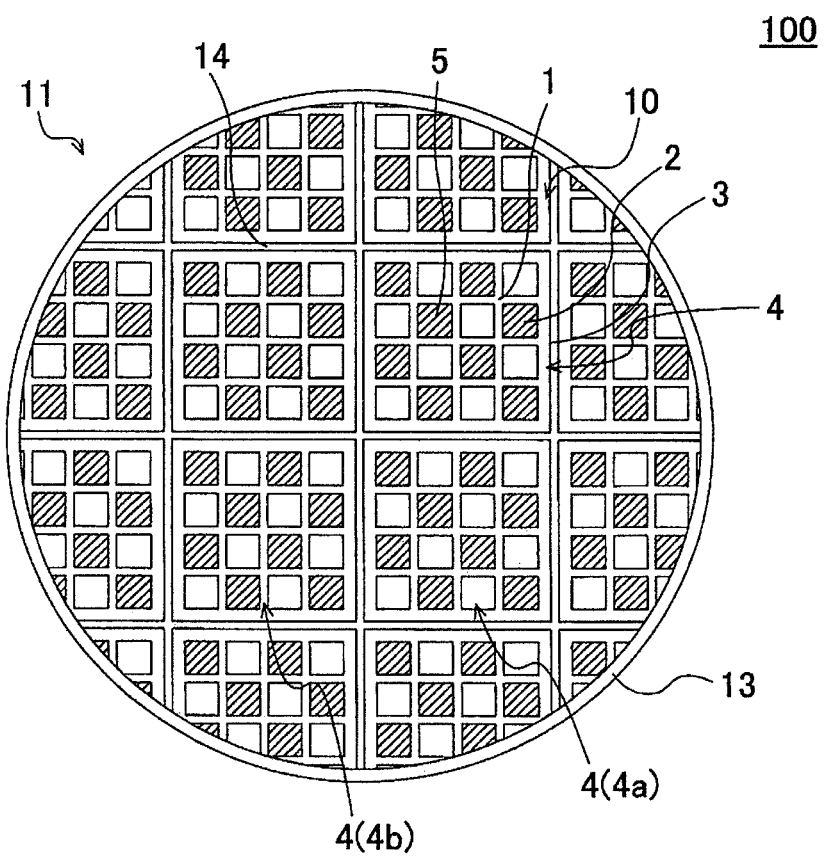
FIG. 2 is a plan view showing a first end face side of the honeycomb structure of FIG. 1.
Figure 3:
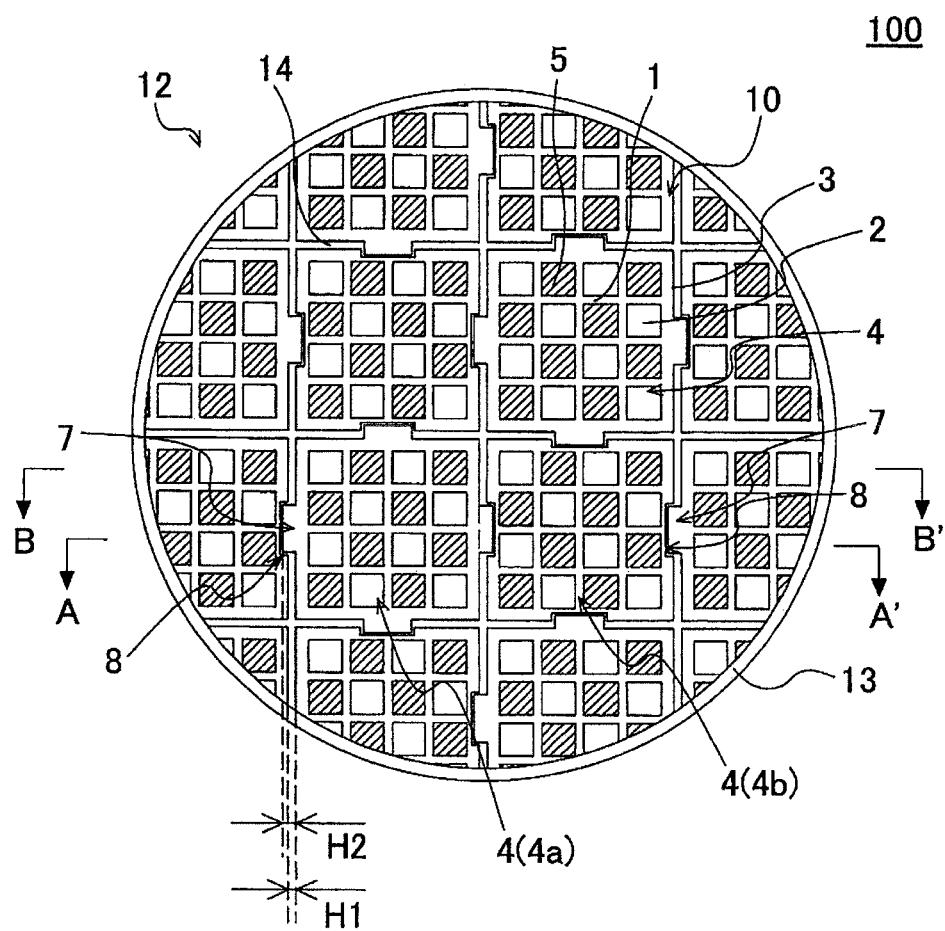
FIG. 3 is a plan view showing a second end face of the honeycomb structure of FIG. 1.
Figure 4:
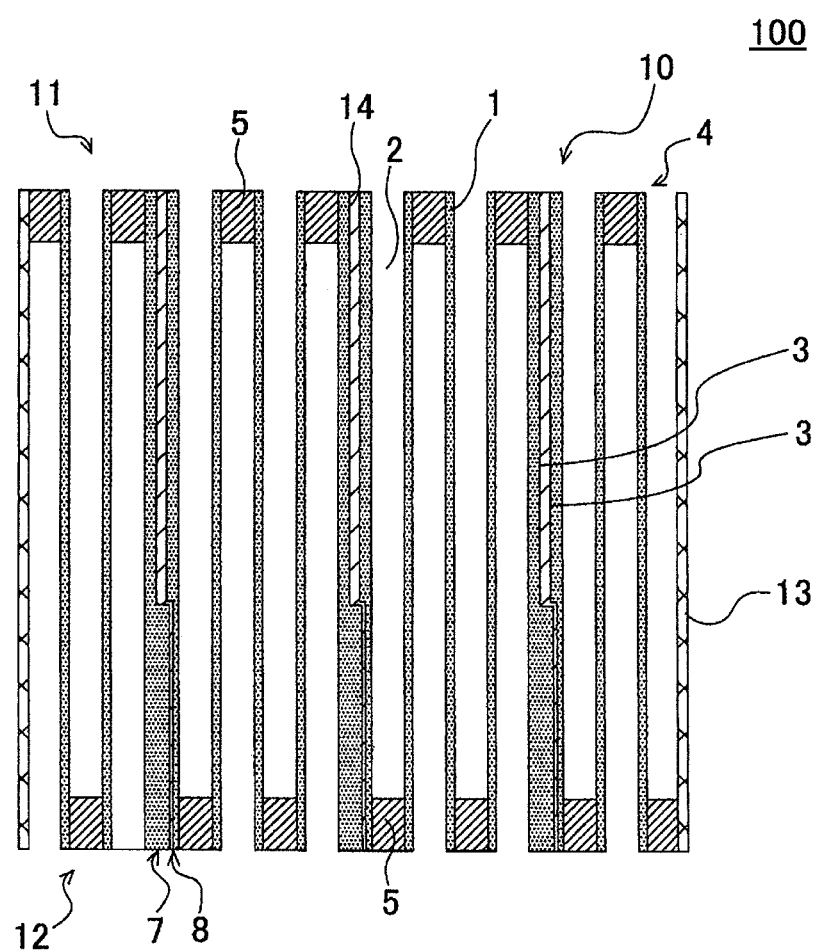
FIG. 4 is a sectional view schematically showing the section taken along A-A' of FIG. 3.
Figure 5:
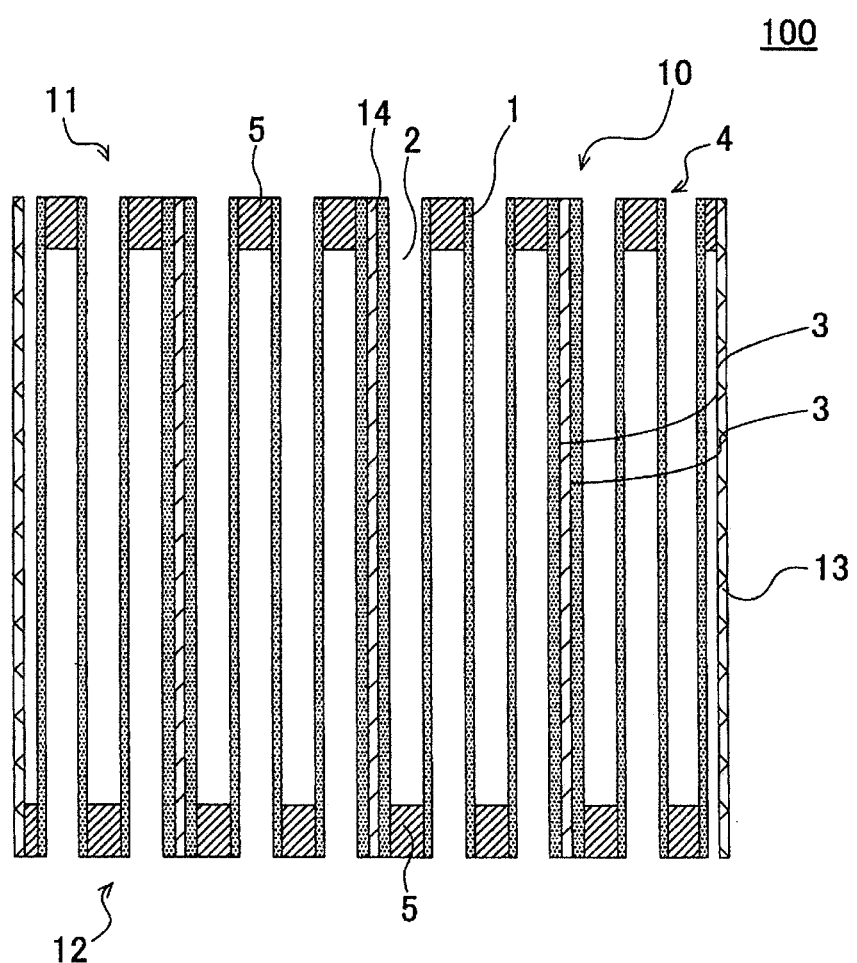
FIG. 5 is a sectional view schematically showing the section taken along B-B' of FIG. 3.

(1) Honeycomb Structure:

A first embodiment of the honeycomb structure of the present invention is a honeycomb structure 100 as shown in FIGS. 1 to 5. FIG. 1 is a perspective view schematically showing the first embodiment of the honeycomb structure of the present invention. FIG. 2 is a plan view showing a first end face side of the honeycomb structure of FIG. 1. FIG. 3 is a plan view showing a second end face side of the honeycomb structure of FIG. 1. FIG. 4 is a sectional view schematically showing the section taken along A-A' of FIG. 3. FIG. 5 is a sectional view schematically showing the section taken along B-B' of FIG. 3.

The honeycomb structure 100 shown in FIGS. 1 to 5 is a honeycomb structure 100 having a segmented structure, including a honeycomb segment bonded member 10 and a circumferential wall 13 disposed so as to surround the circumference of the honeycomb segment bonded member 10.

The honeycomb segment bonded member 10 includes a plurality of pillar-shaped honeycomb segments 4, and a bonding layer 14 that bonds the side faces of the plurality of honeycomb segment 4 in a grid pattern. Each of the honeycomb segments 4 has: a porous partition wall 1 disposed so as to surround a plurality of cells 2 extending from a first end face 11 as the inlet side of fluid to a second end face 12 as the outlet side of the fluid; and a segment outer wall 3 defining the side face of the honeycomb segment 4. The honeycomb segment 4 has a quadrangular prism shape that is a quadrangle in the first end face 11 and the second end face 12.

Figure 6:
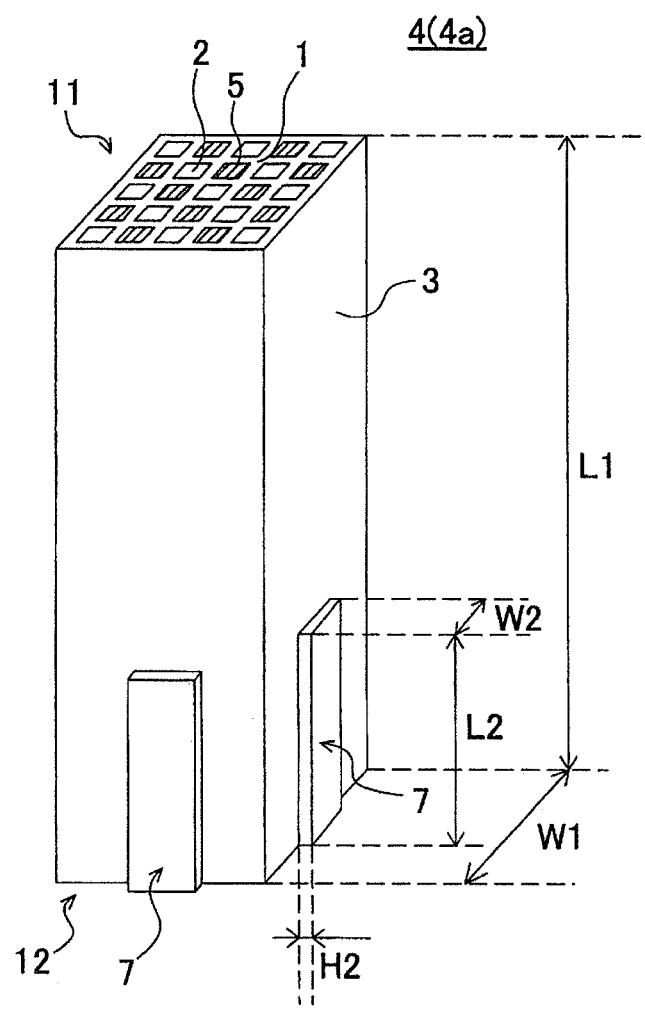
FIG. 6 is a perspective view schematically showing one honeycomb segment included in the first embodiment of the honeycomb structure of the present invention.
Figure 7:
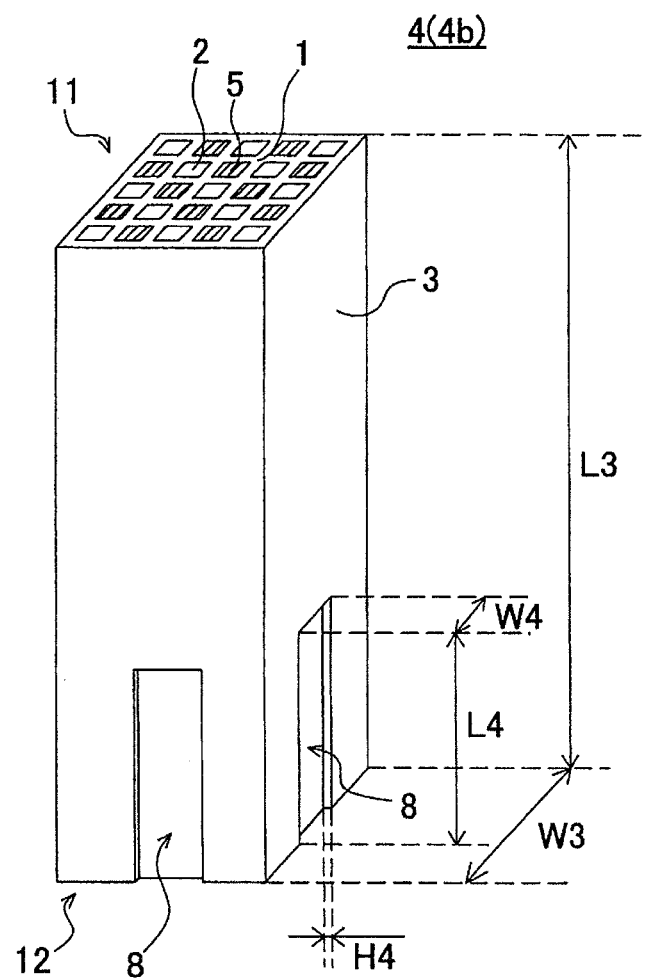
FIG. 7 is a perspective view schematically showing another honeycomb segment included in the first embodiment of the honeycomb structure of the present invention.

The plurality of honeycomb segments 4 in the honeycomb structure 100 includes one honeycomb segment 4a as shown in FIG. 6 and another honeycomb segment 4b as shown in FIG. 7. FIG. 6 is a perspective view schematically showing the one honeycomb segment included in the first embodiment of the honeycomb structure of the present invention. FIG. 7 is a perspective view schematically showing the another honeycomb segment included in the first embodiment of the honeycomb structure of the present invention.

As shown in FIG. 6, the one honeycomb segment 4a has at least one bulge 7 that bulges outward on a segment outer wall 3 that is one side face of the one honeycomb segment 4a. In an axial direction from the first end face 11 to the second end face 12 of the one honeycomb segment 4a, the at least one bulge 7 of the one honeycomb segment 4a is provided so as to start from either the first end face 11 or the second end face 12 and extend in the axial direction. The one honeycomb segment 4a of FIG. 6 is configured so that each of the segment outer walls 3 defining the four side faces has the bulge 7 that starts from the second end face 12 and extends in the axial direction of the one honeycomb segment 4a. The "axial direction" in the present description refers to the direction from the first end face 11 to the second end face 12 of the honeycomb segment 4 unless otherwise specified.

As shown in FIG. 7, the another honeycomb segment 4b has at least one recess 8 that is recessed inward on a segment outer wall 3 that is one side face of the another honeycomb segment 4b. In an axial direction from the first end face 11 to the second end face 12 of the another honeycomb segment 4b, the at least one recess 8 of the another honeycomb segment 4b is provided so as to start from either the first end face 11 or the second end face 12 and extend in the axial direction. The another honeycomb segment 4b of FIG. 7 is configured so that each of the segment outer walls 3 defining the four side faces has the recess 8 that starts from the second end face 12 and extends in the axial direction of the another honeycomb segment 4b.

In the honeycomb segment bonded member 10 shown in FIGS. 1 to 5, the one honeycomb segment 4a shown in FIG. 6 and the another honeycomb segment 4b shown in FIG. 7 are arranged adjacent to each other so that their one side faces are opposed to each other. These honeycomb segments are bonded to each other via the bonding layer 14 so that the bulge 7 of the one honeycomb segment 4a is inserted in the recess 8 of the another honeycomb segment 4b. The honeycomb structure 100 has a particularly major feature about the structure of the bulges 7 of the one honeycomb segment 4a and the recesses 8 of the another honeycomb segment 4b. The following describes the structure of the bulge 7 of the one honeycomb segment 4a and the recess 8 of the another honeycomb segment 4b in more detail.

The one honeycomb segment 4a shown in FIG. 6 is configured so that length W2 of the bulge 7 in the width direction is smaller than length W1 of one side face of the one honeycomb segment 4a in the width direction. The "width direction" means the direction orthogonal to the axial direction of the one honeycomb segment 4a and the bulging height direction of the bulge 7. The "bulging height direction of the bulge 7" is the normal direction to the one side face of the one honeycomb segment 4a.

Figure 8:
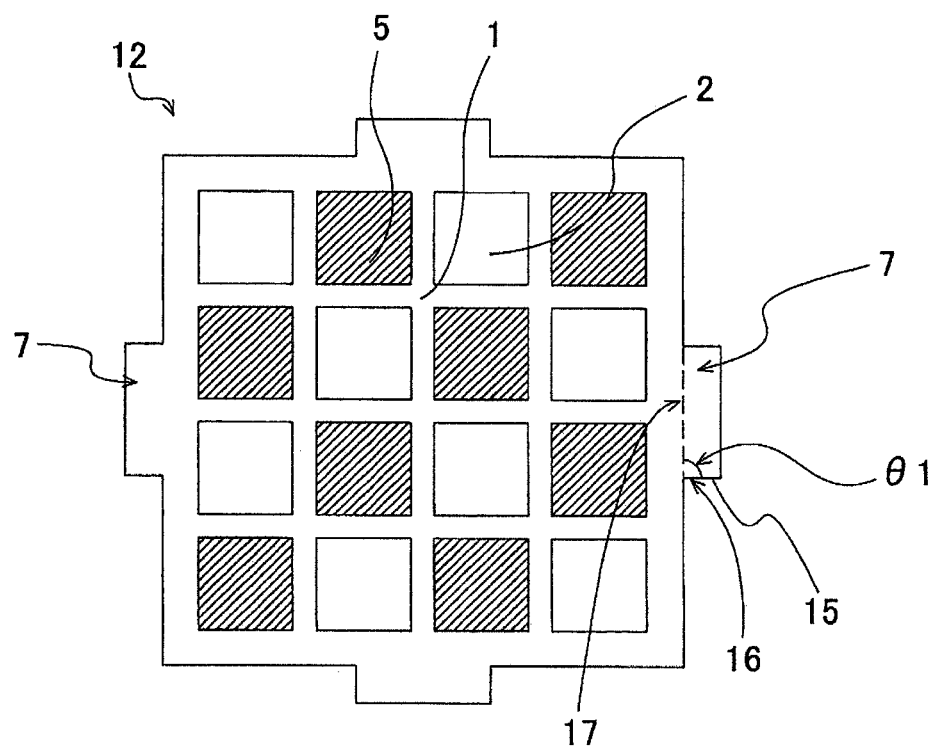
FIG. 8 is an enlarged plan view of the one honeycomb segment in FIG. 3.

On a plane orthogonal to the axial direction, the bulge 7 of the one honeycomb segment 4a has, for example, "angle θ1" of FIG. 8 that is 60° or more. FIG. 8 is an enlarged plan view of the one honeycomb segment shown in FIG. 3. As shown in FIG. 8, a base part 16 of the bulge 7 in the bulging height direction is defined with a bent side face 15 that is bent from the flat portion of the segment outer wall 3 that is one side face. Assuming that the bottom face portion of the bulge 7 is an imaginary bottom face 17, angle θ1 between the imaginary bottom face 17 of the bulge 7 and the bent side face 15 of the bulge 7 is 60° or more. The imaginary bottom face 17 of the bulge 7 is an imaginary bottom face portion of the bulge 7, and is defined with a plane imaginarily extending from a flat part of one side face of the one honeycomb segment 4a. The bent side face 15 of the bulge 7 is not limited to a mountain-like bent that is sharply bent from the flat part, and may be bent so as to depict an arc from the flat part. For example, when the bent side face 15 is bent so as to depict an arc from the flat part of the side face of the one honeycomb segment 4a, the above-described angle θ1 is obtained as follows. First, when the bent side face 15 of the bulge is a curved face, the tangential direction at "a 20% position from the root of the bulge 7 in the bulging height direction" of the bent side face 15 of the bulge is considered as the extending direction of the bent side face 15 of the bulge 7. Then the magnitude of the angle formed by the imaginary bottom face 17 of the bulge 7 and the extending direction of the bent side face 15 of the bulge 7 is defined as angle θ1 described above.

Length W2 of the bulge 7 in the width direction of the one honeycomb segment 4a may not be constant in the bulging height direction. In one example, the bulge 7 of the one honeycomb segment 4a shown in FIG. 6 has a substantially rectangular shape on the plane orthogonal to the axial direction, and length W2 in the width direction is constant in the bulging height direction. On the plane orthogonal to the axial direction, the bulge 7 of the one honeycomb segment 4a may have, for example, a polygonal shape such as a triangle or a trapezoid, or may have a semicircular shape or a semielliptical shape having the bent side face 15 of the bulge 7 that is curved. The shape of the recess 8 of the another honeycomb segment 4b may be appropriately changed according to the shape of the bulge 7 of the one honeycomb segment 4a.

The another honeycomb segment 4b shown in FIG. 7 is configured so that length W4 of the recess 8 in the width direction is smaller than length W3 of one side face of the another honeycomb segment 4b in the width direction. The "width direction" means the direction orthogonal to the axial direction of the another honeycomb segment 4b and the recessing direction of the recess 8. The "recessing direction of the recess 8" is the normal direction to the one side face of the another honeycomb segment 4b.

The honeycomb structure 100 as shown in FIGS. 1 to 5 prevents a crack generated in the bonding layer 14 from penetrating through the entire region of the honeycomb structure 100 in the through channel direction (i.e., axial direction) as compared with a conventional segmented structured honeycomb structure. The honeycomb structure 100 therefore effectively suppresses the separation of the honeycomb segments 4. In the honeycomb structure 100, the honeycomb segment bonded member 10 includes the honeycomb segments 4 having their one side faces opposed to each other, and the honeycomb structure 100 extremely effectively suppresses the separation of such honeycomb segments 4 as well. In other words, the honeycomb segments 4 of the honeycomb segment bonded member 10 can be disposed in a lattice pattern, and the honeycomb structure 100 effectively suppresses the separation of such honeycomb segments 4 as well. Further, if a crack occurs in the bonding layer 14 and some of the honeycomb segments 4 are separated, the honeycomb structure 100 prevents the separated honeycomb segments 4 from falling off to the downstream.

Preferably bulging height H2 (see FIGS. 3 and 6) bulging from one side face of the bulge 7 of the one honeycomb segment 4a is larger than a maximum thickness H1 (see FIG. 3) of the bonding layer 14 between the opposed side faces of the one honeycomb segment 4a and the another honeycomb segment 4b. Even if a crack occurs in the bonding layer 14 and some of the honeycomb segments 4 are separated, this configuration prevents better the separated honeycomb segments 4 from falling off to the downstream.

The honeycomb structure 100 is configured so that length W2 of the bulge 7 in the width direction is smaller than length W1 of one side face of the one honeycomb segment 4a in the width direction and length W4 of the recess 8 in the width direction is smaller than length W3 of one side face of the another honeycomb segment 4b in the width direction. Preferably length W2 of the bulge 7 in the width direction is 20 to 70% of length W1 of one side face of the one honeycomb segment 4a in the width direction and is more preferably 20 to 50%. Preferably length W4 of the recess 8 in the width direction is 20 to 70% of length W3 of one side face of the another honeycomb segment 4b in the width direction and is more preferably 20 to 50%. This configuration effectively suppresses a decrease in the through channel area of the cells 2 in the plane orthogonal to the axial direction of the honeycomb structure 100, and so suppresses an increase in pressure loss of the honeycomb structure 100.

There is no particular limitation on length L2 of the bulge 7 in the axial direction. In one example, length L2 of the bulge 7 in the axial direction may be 5 to 50% of length L1 of the one honeycomb segment 4a in the axial direction, and this is favorable because such a length effectively suppresses a decrease in through channel area. Length L4 of the recess 8 in the axial direction is not particularly limited as long as the length enables insertion of the bulge 7 of the one honeycomb segment 4a that is adjacently disposed and opposed to each other. Specifically, length L4 of the recess 8 in the axial direction may be slightly longer than length L2 of the bulge 7 in the axial direction of the one honeycomb segment 4a that is adjacently disposed and faces to each other. In one example, when length L2 of the bulge 7 in the axial direction is 5 to 50% of length L1 of the one honeycomb segment 4a in the axial direction, length L4 of the recess 8 in the axial direction is preferably 5 to 50% of length L3 of the another honeycomb segment 4b in the axial direction. Preferably, in one honeycomb structure 100, length L1 of the one honeycomb segment 4a in the axial direction is the same as length L3 of the another honeycomb segment 4b in the axial direction.

Angle $\theta 1$ between the imaginary bottom face 17 of the bulge 7 and the bent side face 15 of the bulge 7 is 60° or more. This angle is preferably 60 to 90°, and more preferably 80 to 90°. If angle $\theta 1$ is less than 60°, the position of the bulge 7 inside the recess 8 may not be stable during insertion of the bulge 7 into the recess 8. If angle $\theta 1$ exceeds 90°, the distal end side of the bulge 7 may be too wide, and this may cause the difficulty in inserting the bulge 7.

Figure 15:
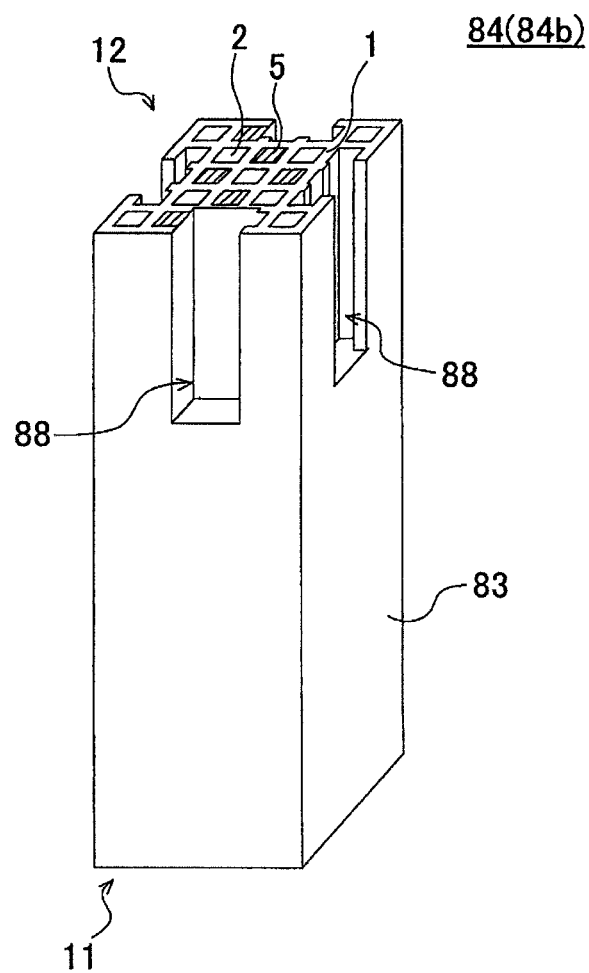
FIG. 15 is a perspective view schematically showing another honeycomb segment included in the fifth embodiment of the honeycomb structure of the present invention.

Depth H4 of the recess 8 corresponds to the bulging height H2 of the bulge 7 of the one honeycomb segment 4a that is adjacently disposed and opposed to each other, and is not limited particularly as long as the depth enables insertion of the bulge 7. Specifically depth H4 of the recess 8 preferably is the same as the bulging height H2 of the bulge 7 of the one honeycomb segment 4a that is adjacently disposed and opposed to each other. Depth H4 of the recess 8 may be smaller than the thickness of the segment outer wall 3 of the another honeycomb segment 4b, or may be larger than the thickness of the segment outer wall 3. Preferably, in the honeycomb structure 100, depth H4 of the recess 8 is smaller than the thickness of the segment outer wall 3 of the another honeycomb segment 4b so that the recess 8 does not penetrate through the segment outer wall 3. In one example, depth H4 of the recess 8 is larger than the thickness of the segment outer wall 3 in another honeycomb segment 84b shown in FIG. 15. The another honeycomb segment 84b shown in FIG. 15 is described later in details. The honeycomb segment 84b in FIG. 15 is configured so that a recess 88 penetrates through a segment outer wall 83 of the another honeycomb segment 84b, and a part of the recess 88 reaches the inside of some of the cells 2 formed in the honeycomb segment 84.

The shape of the cells 2 in each of the honeycomb segments 4 is not limited particularly. For instance, the cells 2 may have various shapes, such as a polygonal shape, a circular shape and an elliptic shape, in a section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, and an octagon. For the shape of the cells 2, all of the cells 2 may have the same shape or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively.

Preferably the cells 2 defined by the partition wall 1 have a cell density that is 15 to 62 cells/cm$^2$, and more preferably 31 to 54 cells/cm$^2$. The honeycomb structure 100 of the present embodiment with this configuration can be favorably used as a purifying member (e.g., a filter or a catalyst carrier) to purify exhaust gas emitted from an automobile engine.

The partition wall 1 preferably has porosity of 30 to 75%, more preferably 35 to 70%, and particularly preferably 40 to 65%. The porosity of the partition wall 1 is a value measured by mercury press-in method. The porosity of the partition wall 1 can be measured using Autopore 9500 (product name) produced by Micromeritics Co, for example. To measure the porosity, a part of the partition wall 1 of each honeycomb segment 4 may be cut out to obtain a test piece for the measurement. If the porosity of the partition wall 1 is less than 30%, the pressure loss of the honeycomb structure 100 may increase or the pressure loss after loading with catalyst may vary largely. If the porosity of the partition wall 1 exceeds 75%, the strength of the honeycomb structure 100 may deteriorate.

The material of the honeycomb segments 4 is not particularly limited, which is preferably at least one type selected from the group of the materials consisting of the following materials from the viewpoint of the strength, heat resistance, durability and the like. The group of the materials includes silicon carbide, silicon-silicon carbide based composite materials, silicon nitride, cordierite, mullite, alumina, spinel, silicon carbide-cordierite based composite materials, lithium aluminum silicate, aluminum titanate and Fe—Cr—Al based metals. Among these materials, silicon carbide or silicon-silicon carbide based composite materials is preferable. Silicon-silicon carbide composite materials are composite materials including silicon carbide (SiC) as the aggregates and silicon (Si) as the binder.

The shape of the honeycomb segments 4 is not limited particularly. Among the honeycomb segments 4, the honeycomb segments 4 disposed at the outermost circumference preferably have a shape, a part of which is processed by grinding or the like according to the overall shape of the honeycomb structure 100. Preferably honeycomb segments 4 other than the honeycomb segments 4 disposed at the outermost circumference have a prismatic columnar shape having a quadrangular shaped section that is orthogonal to the axial direction, for example.

The material of the bonding layer 14 is not limited particularly. The material of the bonding layer used in a conventionally known segmented structured honeycomb structure may be used. The maximum thickness H1 of the bonding layer 14 is not limited particularly. For example, this is preferably 0.5 to 3.0 mm, more preferably 0.5 to 2.0 mm, and particularly preferably 0.5 to 1.5 mm.

The overall shape of the honeycomb structure 100 is not limited particularly. For instance, the overall shape of the honeycomb structure 100 in FIG. 1 has a round pillar shape having first end face 11 and second end face 12 that are circular. Although not shown, the overall shape of the honeycomb structure may be a pillar shape having the first end face and the second end face that are substantially circular in shape, including an ellipse, a racetrack shape, or an oval. The honeycomb structure may have the overall shape that is a prismatic columnar shape having the first end face and the second end face that are a polygon, such as a quadrangle or a hexagon.

The dimensions of the honeycomb structure 100, including the length from the first end face to the second end face and the size of a section orthogonal to the extending direction of the cells 2 of the honeycomb structure 100, are not limited particularly. The dimensions of the honeycomb structure 100 may be selected appropriately so that, when it is used as a filter to purify exhaust gas, the filter can have the optimum ability for purification. For instance, the length from the first end face to the second end face of the honeycomb structure 100 is preferably 100 to 300 mm, and particularly preferably 100 to 200 mm. The area of a section orthogonal to the extending direction of the cells 2 of the honeycomb structure 100 is preferably 15000 to 90000 mm$^2$, and particularly preferably 20000 to 70000 mm$^2$.

In the honeycomb structure 100, the cells 2 of each honeycomb segment 4 may be plugged at the ends on any one of the first end face 11 side and the second end face 12 side with a plugging portion 5. The honeycomb structure 100 with this configuration can be favorably used as a filter to trap and remove particulate matters included in exhaust gas. The material of the plugging portion 5 is not limited particularly. Preferably the plugging portion 5 is made of a material similar to the materials shown as examples of the honeycomb segments 4, for example.

Figure 9:
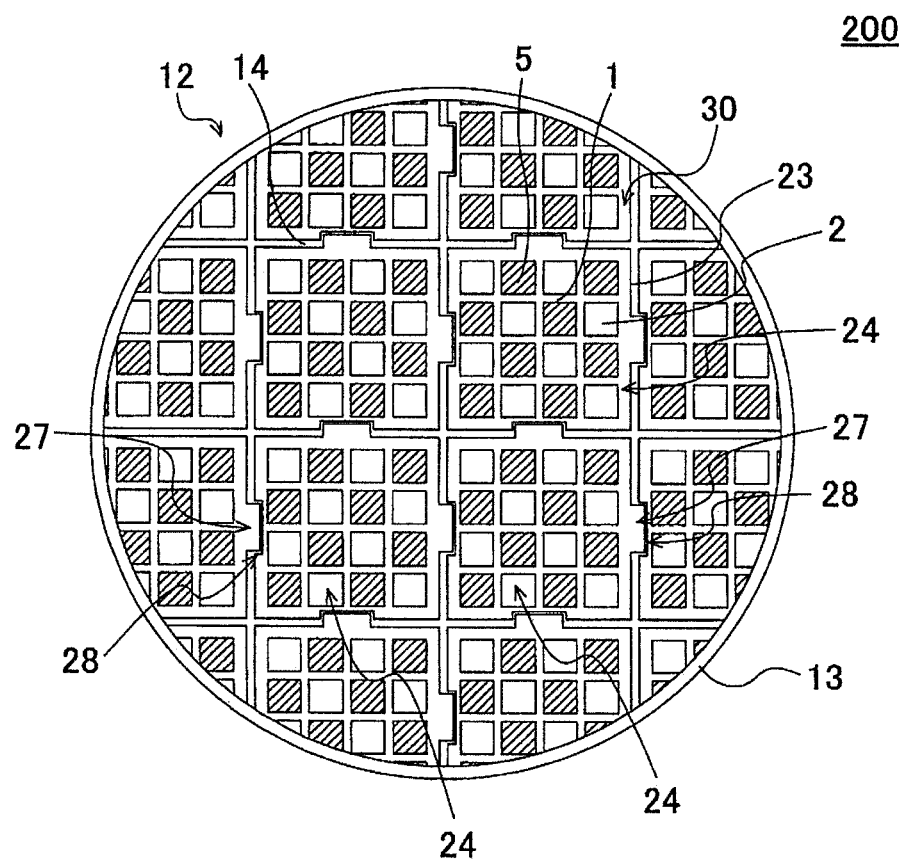
FIG. 9 is a plan view schematically showing a second end face side of a second embodiment of the honeycomb structure of the present invention.
Figure 10:
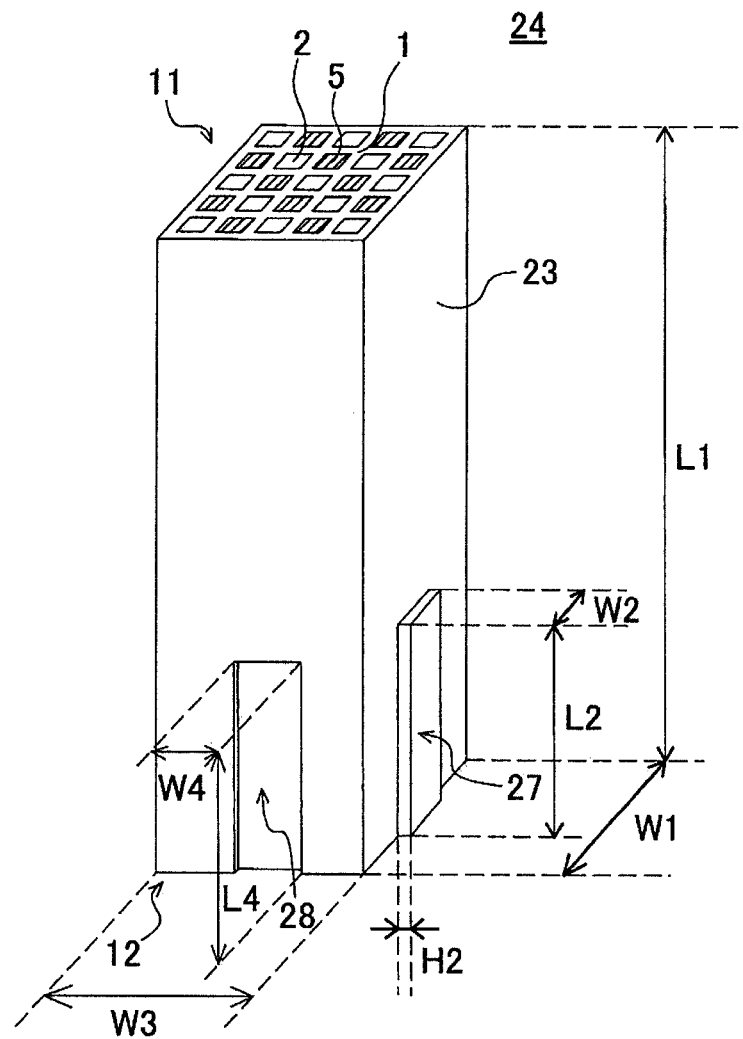
FIG. 10 is a perspective view schematically showing a honeycomb segment included in the second embodiment of the honeycomb structure of the present invention.

Next, the following describes a second embodiment of the honeycomb structure of the present invention, with reference to FIGS. 9 and 10. FIG. 9 is a plan view schematically showing a second end face side of the second embodiment of the honeycomb structure of the present invention. FIG. 10 is a perspective view schematically showing a honeycomb segment included in the second embodiment of the honeycomb structure of the present invention. In FIGS. 9 and 10, like numerals may indicate like components of the honeycomb structure 100 shown in FIGS. 1 to 5 as well as the honeycomb segments 4 shown in FIGS. 6 and 7 and their descriptions may be omitted.

As shown in FIG. 9, a honeycomb structure 200 of the second embodiment is segmented structured honeycomb structure 200, including a honeycomb segment bonded member 30 and a circumferential wall 13 disposed so as to surround the circumference of the honeycomb segment bonded member 30.

The honeycomb segment bonded member 30 includes a plurality of pillar-shaped honeycomb segments 24, and a bonding layer 14 that bonds the side faces of the plurality of honeycomb segment 24 in a grid pattern. Each of the honeycomb segments 24 has: a porous partition wall 1 disposed so as to surround a plurality of cells 2 extending from a first end face 11 to a second end face 12; and a segment outer wall 23 defining the side face of the honeycomb segment 24.

In the honeycomb structure 200 of the second embodiment, the honeycomb segment bonded member 30 includes a honeycomb segment 24 as shown in FIG. 10. The honeycomb segment 24 has a bulge 27 bulging outward on one side face of a quadrangular prism shape, and a recess 28 recessed inward on another side face of the quadrangular prism shape. In this way, the honeycomb segment 24 as a single honeycomb segment 24 has the function of the one honeycomb segment 4a shown in FIG. 6 as well as the function of the another honeycomb segment 4b shown in FIG. 7. In the honeycomb structure 200 of the second embodiment, the plurality of honeycomb segments 24 is disposed adjacently so that their side faces are opposed to each other. In this state, the bulge 27 of one honeycomb segment 24 is inserted into the recess 28 of another honeycomb segment 24. The honeycomb structure 200 with such a configuration also has the advantageous effects similar to those of the honeycomb structure 100 of the first embodiment as described above (see FIGS. 1 to 5).

When a single honeycomb segment 24 has both of the bulge 27 and the recess 28 like the honeycomb segment 24, the honeycomb segment 24 preferably has, for example, the bulges 27 on half of the side faces of the prismatic columnar shaped segment, and has the recesses 28 on the other half of the side faces. For example, when the honeycomb segment 24 has a quadrangular prism shape, the honeycomb segment 24 preferably has the bulges 27 on two side faces, and has the recesses 28 on the remaining two side faces. With this configuration, the honeycomb segments 24 of one type can be combined to easily obtain the honeycomb segment bonded member 30, in which the bulge 27 of one of the honeycomb segments 24 is inserted into the recess 28 of another honeycomb segment 24. In the honeycomb structure 100 of the first embodiment (see FIGS. 1 to 5), the one honeycomb segment 4a and the another honeycomb segment 4b are the honeycomb segments 4 having different structures. Note here that the one honeycomb segment 4a may be a honeycomb segment 4 having at least one bulge 7, and the another honeycomb segment 4b may be a honeycomb segment 4 having at least one recess 8. The honeycomb structure of the present invention therefore includes two honeycomb segments (that is, one honeycomb segment and another honeycomb segment) disposed adjacent to each other so that their one side faces are opposed to each other, and these two honeycomb segments may be different or be the same.

The bulge 27 and the recess 28 of the honeycomb segment 24 shown in FIG. 10 preferably have, for example, the structures similar to those of the bulge 7 of the honeycomb segment 4 of FIG. 6 and the recess 8 of the honeycomb segment 4 shown in FIG. 7, respectively. For example, the bulge 27 of the honeycomb segment 24 shown in FIG. 10 preferably has length W2 in the width direction, bulging height H2, and length L2 in the axial direction that are similar to those of the bulge 7 of the honeycomb segment 4 shown in FIG. 6. The recess 28 of the honeycomb segment 24 shown in FIG. 10 preferably has length W4 in the width direction and length L4 in the axial direction that are similar to those of the recess 8 of the honeycomb segment 4 shown in FIG. 7.

Figure 11:
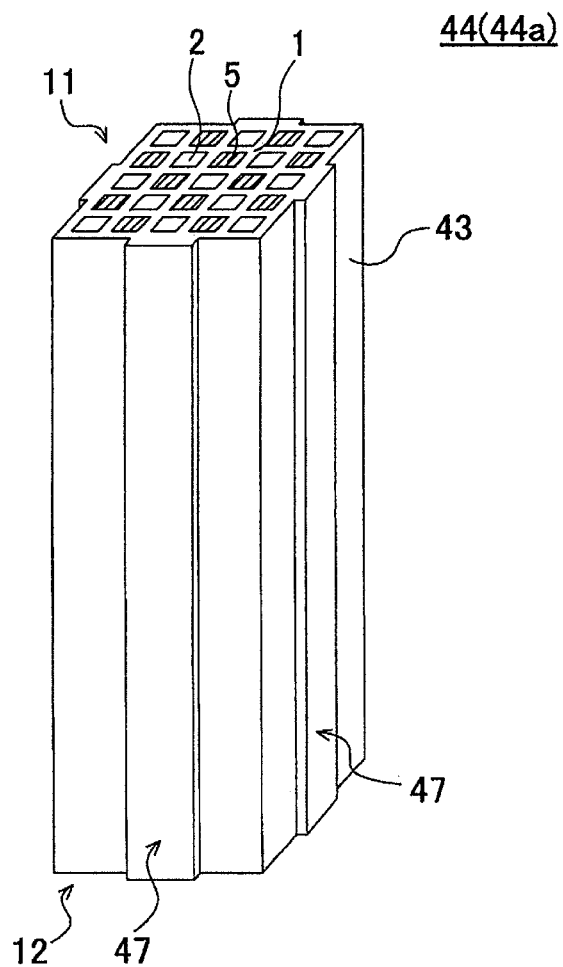
FIG. 11 is a perspective view schematically showing one honeycomb segment included in a third embodiment of the honeycomb structure of the present invention.
Figure 12:
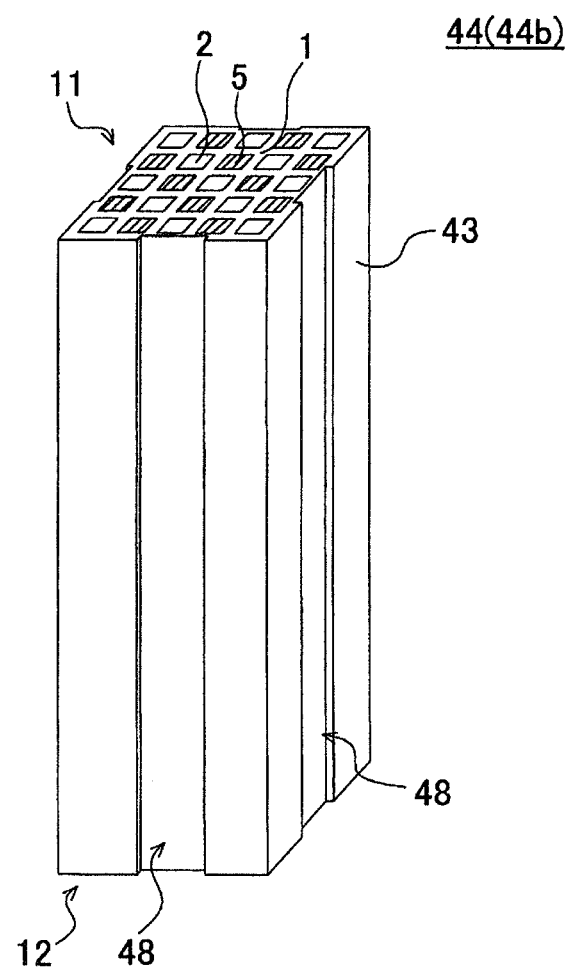
FIG. 12 is a perspective view schematically showing another honeycomb segment included in the third embodiment of the honeycomb structure of the present invention.
Figure 13:
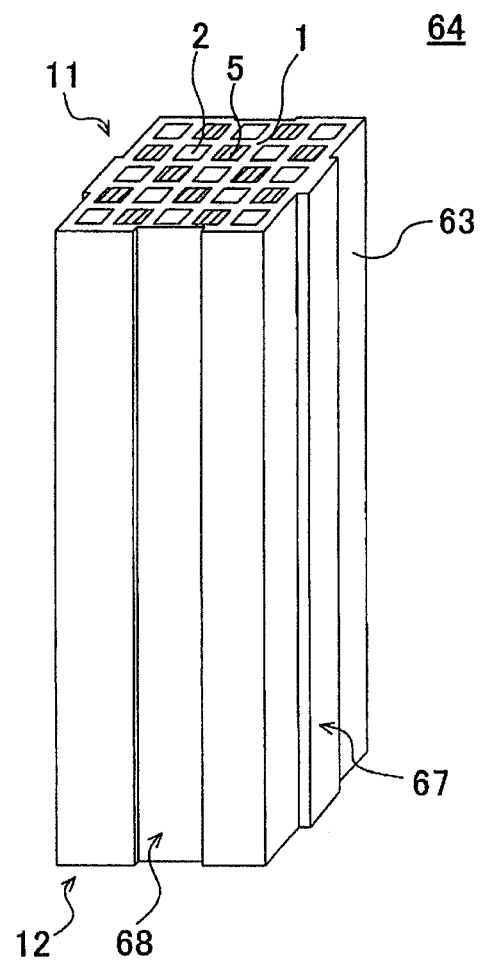
FIG. 13 is a perspective view schematically showing a honeycomb segment included in a fourth embodiment of the honeycomb structure of the present invention.

Next, the following describes third and fourth embodiments of the honeycomb structure of the present invention, with reference to FIGS. 11 to 13. FIG. 11 is a perspective view schematically showing one honeycomb segment included in a third embodiment of the honeycomb structure of the present invention. FIG. 12 is a perspective view schematically showing another honeycomb segment included in the third embodiment of the honeycomb structure of the present invention. FIG. 13 is a perspective view schematically showing a honeycomb segment included in a fourth embodiment of the honeycomb structure of the present invention. In FIGS. 11 to 13, like numerals may indicate like components of the honeycomb segments 4 shown in FIGS. 6 and 7 and their descriptions may be omitted.

In a honeycomb structure of the third embodiment (not shown), a honeycomb segment bonded member (not shown) includes two types of honeycomb segments 44 shown in FIGS. 11 and 12. Preferably the honeycomb structure of the third embodiment (not shown) has a structure similar to that of the honeycomb structure 100 of the first embodiment described above (see FIGS. 1 to 5) except that it includes the honeycomb segments 44 shown in FIGS. 11 and 12.

A honeycomb segment 44*a* shown in FIG. 11 has a bulge 47 that bulges outward on a segment outer wall 43 that makes up the side faces of the quadrangular prism shaped segment. The bulge 47 of the honeycomb segment 44*a* is provided so as to start from the first end face 11 and end at the second end face 12, and extend in the axial direction of the honeycomb segment 44*a*. A honeycomb segment 44*b* shown in FIG. 12 has a recess 48 that is recessed inward on a segment outer wall 43 that makes up the side faces of the quadrangular prism shaped segment. The recess 48 of the honeycomb segment 44*b* is provided so as to start from the first end face 11 and end at the second end face 12, and extend in the axial direction of the honeycomb segment 44*b*.

In the honeycomb structure of the third embodiment, a honeycomb segment bonded member (not shown) includes the honeycomb segment 44*a* shown in FIG. 11 and the honeycomb segment 44*b* shown in FIG. 12 that are disposed adjacent to each other so that their one side faces are opposed to each other. The honeycomb structure with such a configuration also has the advantageous effects similar to those of the honeycomb structure 100 of the first embodiment as described above (see FIGS. 1 to 5).

Preferably the honeycomb segment 44*a* shown in FIG. 11 has a structure similar to that of the one honeycomb segment 4*a* shown in FIG. 6 except for the length of the bulge 47 in the axial direction. Preferably the honeycomb segment 44*b* shown in FIG. 12 has a structure similar to that of the another honeycomb segment 4*b* shown in FIG. 7 except for the length of the recess 48 in the axial direction.

Next, the following describes a honeycomb structure of the fourth embodiment (not shown). In the honeycomb structure of the fourth embodiment (not shown), a honeycomb segment bonded member (not shown) includes honeycomb segments 64 shown in FIG. 13. Preferably the honeycomb structure of the fourth embodiment (not shown) has a structure similar to that of the honeycomb structure 200 of the second embodiment described above (see FIG. 9) except that it includes the honeycomb segments 64 shown in FIG. 13.

The honeycomb segment 64 shown in FIG. 13 has a bulge 67 that bulges outward and a recess 68 that is recessed inward on a segment outer wall 63 that makes up the side faces of the quadrangular prism shaped segment. The bulge 67 and the recess 68 of the honeycomb segment 64 are provided so as to start from the first end face 11 and end at the second end face 12, and extend in the axial direction of the honeycomb segment 64. The honeycomb structure with such a configuration also has the advantageous effects similar to those of the honeycomb structure 200 of the second embodiment as described above (see FIG. 9).

Preferably the honeycomb segment 64 shown in FIG. 13 has a structure similar to that of the honeycomb segment 24 shown in FIG. 10 except for the length of the bulge 67 and the recess 68 in the axial direction.

Figure 14:
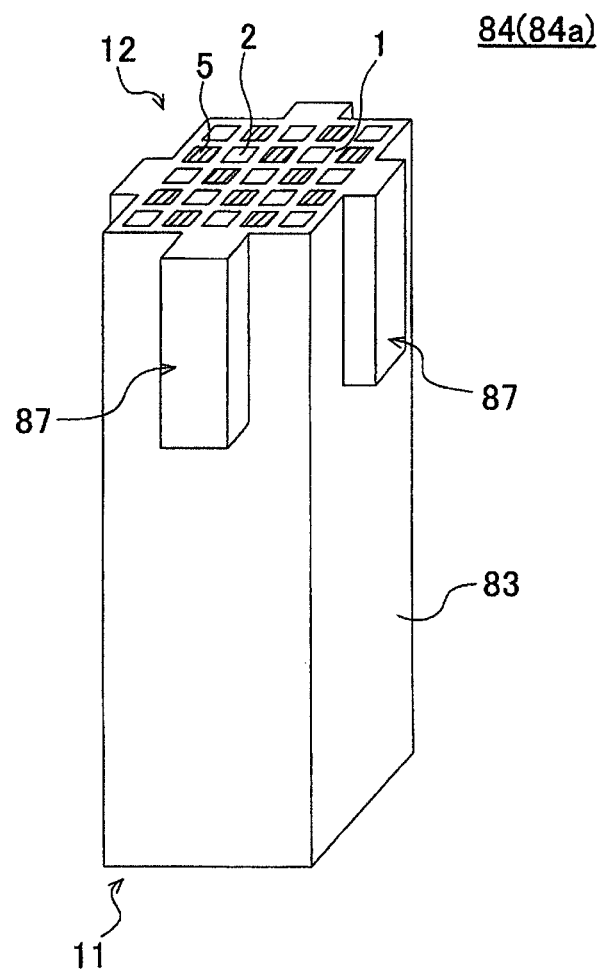
FIG. 14 is a perspective view schematically showing one honeycomb segment included in a fifth embodiment of the honeycomb structure of the present invention.
Figure 16:
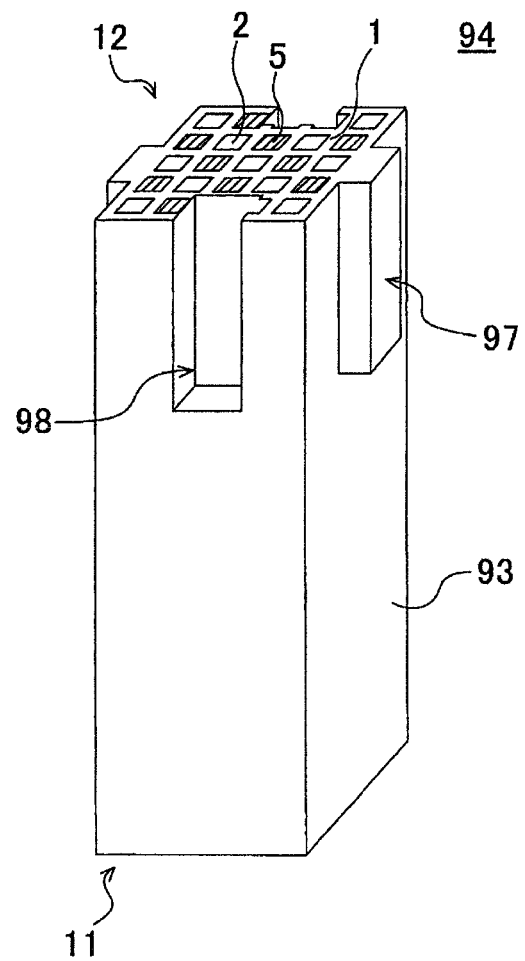
FIG. 16 is a perspective view schematically showing a honeycomb segment included in a sixth embodiment of the honeycomb structure of the present invention.
Figure 17:
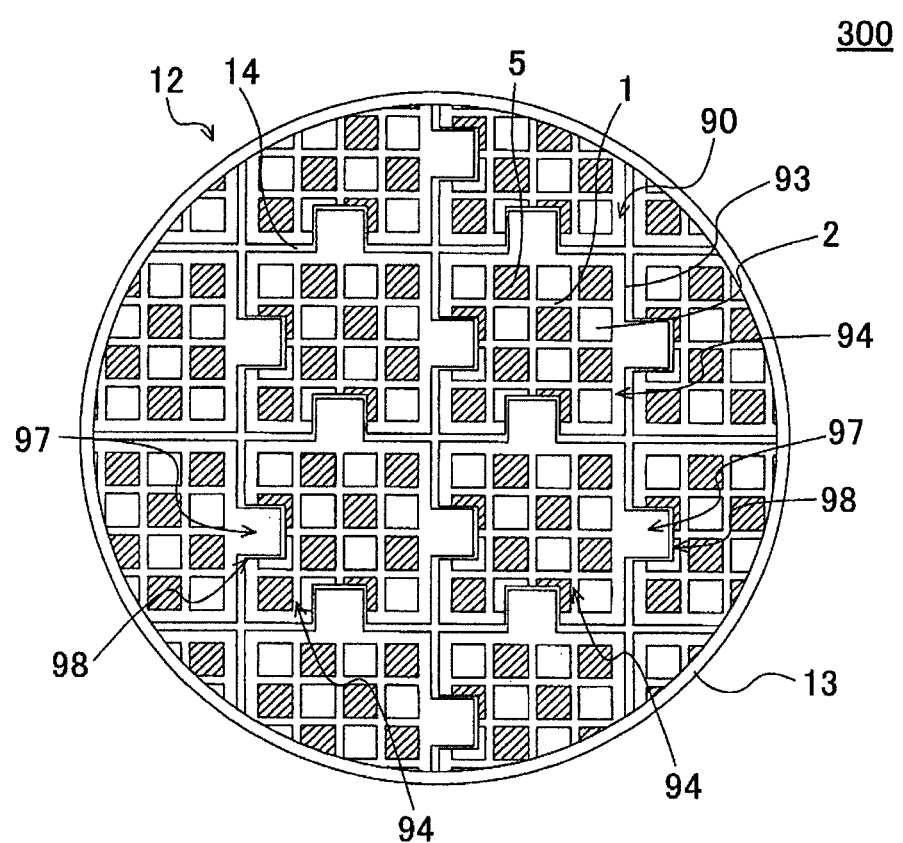
FIG. 17 is a plan view schematically showing a second end face side of the sixth embodiment of the honeycomb structure of the present invention.

Next, the following describes fifth and sixth embodiments of the honeycomb structure of the present invention, with reference to FIGS. 14 to 17. FIG. 14 is a perspective view schematically showing one honeycomb segment included in a fifth embodiment of the honeycomb structure of the present invention. FIG. 15 is a perspective view schematically showing another honeycomb segment included in the fifth embodiment of the honeycomb structure of the present invention. FIG. 16 is a perspective view schematically showing a honeycomb segment included in a sixth embodiment of the honeycomb structure of the present invention. FIG. 17 is a plan view schematically showing a second end face side of the sixth embodiment of the honeycomb structure of the present invention. In FIGS. 14 to 16, like numerals may indicate like components of the honeycomb segments 4 shown in FIGS. 6 and 7 and their descriptions may be omitted. In FIG. 17, like numerals may indicate like components of the honeycomb structure 200 shown in FIG. 9 and their descriptions may be omitted.

In a honeycomb structure of the fifth embodiment (not shown), a honeycomb segment bonded member (not shown) includes two types of honeycomb segments 84 shown in FIGS. 14 and 15. Preferably the honeycomb structure of the fifth embodiment (not shown) has a structure similar to that of the honeycomb structure 100 of the first embodiment described above (see FIGS. 1 to 5) except that it includes the honeycomb segments 84 shown in FIGS. 14 and 15.

A honeycomb segment 84*a* shown in FIG. 14 has a bulge 87 that bulges outward on a segment outer wall 83 that makes up the side faces of the quadrangular prism shaped segment. The bulge 87 of the honeycomb segment 84*a* is provided to start from the second end face 12, and extend in the axial direction of the honeycomb segment 84*a*. A honeycomb segment 84*b* shown in FIG. 15 has a recess 88 that is recessed inward on a segment outer wall 83 that makes up the side faces of the quadrangular prism shaped segment. The recess 88 of the honeycomb segment 84*b* is provided so as to start from the second end face 12, and extend in the axial direction of the honeycomb segment 84*b*.

The honeycomb segment 84b shown in FIG. 15 corresponds to the another honeycomb segment 4b shown in FIG. 7, and is different in the structure of the recess 88 recessed inward from that of the recess 8 of the another honeycomb segment 4b shown in FIG. 7. Specifically the recess 88 of the honeycomb segment 84b shown in FIG. 15 penetrates through a segment outer wall 83 of the honeycomb segment 84b, and has the depth of the recess that reaches the cells 2 at the outermost circumference of the honeycomb segment 84b. Note that, in another example, the depth of the recess 88 may be deeper than that shown in FIG. 15. For example, although illustration is omitted, the recess 88 of the honeycomb segment 84b may be recessed inward of the outer partition wall 1 that defines the cells 2 at the outermost circumference.

The bulging height of the bulge 87 of the honeycomb segment 84a shown in FIG. 14 corresponds to the depth of the recess 88 of the honeycomb segment 84b shown in FIG. 15. In the honeycomb structure of the fifth embodiment, a honeycomb segment bonded member (not shown) includes the honeycomb segment 84a shown in FIG. 14 and the honeycomb segment 84b shown in FIG. 15 that are disposed adjacent to each other so that their one side faces are opposed to each other. The honeycomb structure with such a configuration also has the advantageous effects similar to those of the honeycomb structure 100 of the first embodiment as described above (see FIGS. 1 to 5). The honeycomb structure of the present embodiment particularly effectively suppresses the falling off of the honeycomb segments.

Preferably the honeycomb segment 84a shown in FIG. 14 has a structure similar to that of the one honeycomb segment 4a shown in FIG. 6 except for the bulging height of the bulge 87. Preferably the honeycomb segment 84b shown in FIG. 15 has a structure similar to that of the another honeycomb segment 4b shown in FIG. 7 except for the depth of the recess 48.

Next, the following describes the sixth embodiment of the honeycomb structure, with reference to FIGS. 16 and 17. As shown in FIG. 17, in a honeycomb structure 300 of the sixth embodiment, a honeycomb segment bonded member 90 includes honeycomb segments 94. Preferably the honeycomb structure 300 of the sixth embodiment has a structure similar to that of the honeycomb structure 200 of the second embodiment described above (see FIG. 9) except that it includes the honeycomb segments 94. FIG. 16 is a perspective view schematically showing the honeycomb segment included in the sixth embodiment, and shows a modified example of the honeycomb segment 94 shown in FIG. 17.

The honeycomb segment 94 shown in FIG. 16 has a bulge 97 that bulges outward and a recess 98 that is recessed inward on a segment outer wall 93 that makes up the side faces of the quadrangular prism shaped segment. The bulge 97 and the recess 98 of the honeycomb segment 94 are provided so as to start from the second end face 12 and extend in the axial direction of the honeycomb segment 94. The recess 98 of the honeycomb segment 94 penetrates through the segment outer wall 93 of the honeycomb segment 94, and has the depth of the recess that reaches the cells 2 at the outermost circumference of the honeycomb segment 94. The bulging height of the bulge 87 of the honeycomb segment 94 corresponds to the depth of the recess 98 as stated above. The honeycomb structure with such a configuration also has the advantageous effects similar to those of the honeycomb structure 200 of the second embodiment as described above (see FIG. 9). The honeycomb structure 300 of the present embodiment particularly effectively suppresses the falling off of the honeycomb segments.

Preferably the honeycomb segment 94 shown in FIG. 16 has a structure similar to that of the honeycomb segment 24 shown in FIG. 10 except for the bulging height of the bulge 97 and the depth of the recess 98.

(2) Method for Manufacturing a Honeycomb Structure:

Next, the following describes a method for manufacturing the honeycomb structure of the present invention. The method for manufacturing the honeycomb structure may include a "honeycomb segment manufacturing step", an "assembled member manufacturing step", and a "bonded member manufacturing step".

The honeycomb segment manufacturing step is a step of manufacturing a plurality of prismatic columnar shaped honeycomb segments 4 as shown in FIGS. 6 and 7 that each have the porous partition wall 1 disposed to surround the plurality of cells 2, and the segment outer wall 3 disposed to surround the partition wall 1. The honeycomb segment manufacturing step may be performed according to a method for manufacturing a honeycomb segment to manufacture a conventionally known segmented structured honeycomb structure.

The honeycomb segment manufacturing step forms the honeycomb segment 4 having the bulge 7 as shown in FIG. 6 on the surface of the segment outer wall 3 by the following method so that the bulge 7 has a desired bulging height H2. Specifically the step firstly manufactures a formed body for manufacturing a honeycomb segment 4 by extrusion, for example. At this time, the step forms the formed body for the honeycomb segment 4 so that the thickness of the segment outer wall includes the bulging height H2 of the bulge 7. Then the step fires the manufactured formed body for the honeycomb segment 4 to manufacture a precursor of the honeycomb segment 4. Then, the step forms a desired bulge on the precursor of the honeycomb segment 4 by grinding, for example, to grind an unnecessary part of the segment outer wall.

The honeycomb segment manufacturing step forms the honeycomb segment 4 having the recess 8 as shown in FIG. 7 on the surface of the segment outer wall 3 by the following method so that the recess 8 has a desired depth H4. Specifically the step manufactures a precursor of the honeycomb segment 4 without a recess 8 on the surface of the segment outer wall 3 by a conventionally known method. The step then grinds a part of the segment outer wall 3 of the manufactured precursor of the honeycomb segment 4 to form a desired recess.

The assembled member manufacturing step is a step of combining a plurality of honeycomb segments in a grid pattern to manufacture an assembled member of the honeycomb segments. More specifically, the assembled member manufacturing step firstly applies a bonding paste to the side faces (i.e., segment outer wall) of the honeycomb segments. Next, the step combines the plurality of honeycomb segments in a grid pattern so that the bonding paste intervenes between their opposed side faces, and so manufactures an assembled member of the honeycomb segments. At this time, the step combines the plurality of honeycomb segments in a grid pattern so that a bulge of one honeycomb segment fits into a recess of another honeycomb segment.

The bonded member manufacturing step is a step of drying the assembled member of the honeycomb segments to bond the side faces of the plurality of honeycomb segments with the bonding paste and manufacture a bonded member of the honeycomb segments. The bonded member manufacturing step is mainly to dry and solidify the bonding paste that bonds the side faces of the honeycomb segments. The dried and solidified bonding paste becomes a bonding layer of the honeycomb structure, and the drying and solidification at this step develop a desired bonding force at the bonding layer.

A method for drying is not particularly limited, and exemplary methods include an electromagnetic wave heating method such as microwave heat-drying and high-frequency induction heating drying and an external heating method such as hot air drying and superheated steam drying. Among them, a preferable method is drying a certain amount of water by an electromagnetic wave heating method, and then drying the remaining water by an external heating method, because this method enables drying of the formed body as a whole quickly and uniformly without cracks.

After a bonded member of honeycomb segments is manufactured by the bonded member manufacturing step, the circumferential portion of the obtained bonded member may be ground to have a desired shape. For example, by performing such grinding, the round pillar-shaped honeycomb segment bonded member 10 as shown in FIGS. 1 to 5 can be manufactured. After grinding the circumferential portion of the bonded body, a circumference coating layer may be disposed on the circumferential face to manufacture the circumferential wall 13 (see FIG. 1) of the honeycomb structure 100 (see FIG. 1). The manufacturing steps after the bonded member manufacturing step may be performed according to a method for manufacturing a conventionally known segmented structured honeycomb structure, for example.

EXAMPLES

The following describes the present invention more specifically by way of examples, and the present invention is by no means limited to these examples.

Example 1

To manufacture honeycomb segments, a mixed raw material of silicon carbide (SiC) powder and metal silicon (Si) powder was firstly prepared as the raw material powder to prepare a kneaded material. Then, an appropriate amount of binder, pore former, and water were added to the prepared mixed raw material to prepare a plastic kneaded material.

Next, the obtained kneaded material was formed using an extruder to manufacture forty nine honeycomb formed bodies each having a quadrangular prism shape. Then, a bulge were formed on each of the side faces of twenty-two of the honeycomb formed bodies, and a recess was formed on each of the side faces of twenty-one of the honeycomb formed bodies.

Next, the obtained honeycomb formed bodies were dried by high-frequency induction heating, followed by drying again by a hot-air drier. Next, a plugging portion was provided at the ends of the cells of each dried honeycomb segment formed body so as to plug open ends of the cells alternately at the first end face and the second end face.

Next, each of the honeycomb segment formed bodies were degreased and fired to manufacture honeycomb segments. The end face of each honeycomb segment was a square having one side of 39.4 mm. The size of the end face of the honeycomb segment corresponds to lengths W1 and W3 of the honeycomb segments in the width direction. Each honeycomb segment had lengths L1 and L3 of 304.8 mm in the axial direction from the first end face to the second end face. The honeycomb segment had the thickness of the segment outer wall of 1.5 mm. Table 1 shows the structure of these honeycomb segments.

The honeycomb segments having bulges had the bulges on the four side faces of the quadrangular prism shaped segment, and the bulges were provided so as to start from the second end face and extend in the axial direction of the honeycomb segment. Length L2 of the bulge in the axial direction was 76.2 mm, bulging height H2 was 1.2 mm, and length W2 in the width direction was 20 mm. The honeycomb segments having recesses had the recesses on the four side faces of the quadrangular prism shaped segment, and the recesses were provided so as to start from the second end face and extend in the axial direction of the honeycomb segment. Length L4 of the recess in the axial direction was 77.2 mm, depth H4 was 1.2 mm, and length W4 in the width direction was 22 mm. Table 2 shows the structure of the bulges and recesses of the honeycomb segments.

Next, bonding paste, which was SiC-based mortar adhesive, was applied to the side faces of the honeycomb segment. Then, the forty nine honeycomb segments were combined in a grid pattern via the bonding paste so that the honeycomb segments having bulges and the honeycomb segments having the recesses were alternately arranged to manufacture an assembled member of the honeycomb segments. Table 1 indicates the arrangement and the number of the honeycomb segments to manufacture the assembled member of honeycomb segments in the fields of the "Arrangement" and "Total number" below the "Honeycomb segment". When seven honeycomb segments are arranged in each of the vertical direction and the horizontal direction as described above, for example, the field of "Arrangement" indicates this as "7×7".

The field of "Ref. Fig." in Table 1 indicates the number of the drawing for reference about the shape and the arrangement of the honeycomb segments in Examples. For example, the honeycomb structure of Example 1 includes honeycomb segments with bulges as one honeycomb segments and honeycomb segments with recesses as another honeycomb segments, and has the arrangement of the honeycomb segments 4a and 4b as shown in FIG. 3. That is, as shown in FIG. 3, the one honeycomb segments 4a and the another honeycomb segments 4b are alternately arranged with the bonding layer 14 interposed therebetween. These honeycomb segments are mutually bonded via the bonding layer 14 so that a bulge 7 of one honeycomb segment 4a is inserted in the recess 8 of the another honeycomb segment 4b.

Next, the assembled member of honeycomb segments was dried in an air atmosphere at 100° C. for 1 hour to manufacture a bonded member of honeycomb segments. Next, the manufactured honeycomb segment bonded member was grounded at the circumference to have a round pillar shape, and a circumference coating layer was provided on the circumferential face, whereby a honeycomb structure was manufactured. In the honeycomb structure of Example 1, the maximum thickness H1 of the bonding layer between the mutually opposed side faces of the honeycomb segments was 1.0 mm. Table 1 shows the result.

The percentage of the ratio of length L2 of the bulges in the axial direction to length L1 of the honeycomb segments in the axial direction is shown in the field of "L2/L1 (%)" in Table 3. The percentage of the ratio of length L4 of the recesses in the axial direction to length L3 of the honeycomb segments in the axial direction is shown in the field of "L4/L3 (%)" in Table 3. The percentage of the ratio of length W2 of the bulges in the width direction to length W1 of the honeycomb segments in the width direction is shown in the field of "W2/W1 (%)" in Table 3. The percentage of the ratio of length W4 of the recesses in the width direction to length W3 of the honeycomb segments in the width direction is shown in the field of "W4/W3 (%)" in Table 3. The percentage of the ratio of bulging height H2 of the bulges to the maximum thickness H1 of the bonding layer is shown in the field of "H2/H1 (%)" in Table 3.

TABLE 1

| | honeycomb structure | | | honeycomb segment | | | bonding layer | |
| --- | --- | --- | --- | --- | --- | --- | --- | --- |
| | diameter (mm) | Ref. FIG. | Arrangement | Total Number | Length L1, L3 in axial direction (mm) | Length W1, W3 in width direction (mm) | Max. thickness H1 of bonding layer (mm) | Starting point of bulges and recesses |
| Ex. 1 | 266.7 | FIG. 3 | 7 × 7 | 49 | 304.8 | 39.4 | 1 | 2nd end face side |
| Ex. 2 | 266.7 | FIG. 3 | 7 × 7 | 49 | 304.8 | 39.4 | 1 | 2nd end face side |
| Ex. 3 | 266.7 | FIG. 3 | 7 × 7 | 49 | 304.8 | 39.4 | 1 | 2nd end face side |
| Ex. 4 | 266.7 | FIG. 3 | 7 × 7 | 49 | 304.8 | 39.4 | 1 | both end faces |
| Ex. 5 | 266.7 | FIG. 3 | 7 × 7 | 49 | 304.8 | 39.4 | 1 | 2nd end face side |
| Ex. 6 | 266.7 | FIG. 3 | 7 × 7 | 49 | 304.8 | 39.4 | 1 | 2nd end face side |
| Ex. 7 | 266.7 | FIG. 3 | 7 × 7 | 49 | 304.8 | 39.4 | 1 | 2nd end face side |
| Ex. 8 | 266.7 | FIG. 3 | 7 × 7 | 49 | 304.8 | 39.4 | 1 | 2nd end face side |
| Ex. 9 | 266.7 | FIG. 3 | 7 × 7 | 49 | 304.8 | 39.4 | 1 | 2nd end face side |
| Ex. 10 | 266.7 | FIG. 3 | 7 × 7 | 49 | 304.8 | 39.4 | 1 | 2nd end face side |
| Ex. 11 | 190.5 | FIG. 17 | 5 × 5 | 25 | 177.8 | 39.4 | 1.2 | 2nd end face side |
| Ex. 12 | 190.5 | FIG. 17 | 5 × 5 | 25 | 177.8 | 39.4 | 1.2 | 2nd end face side |
| Ex. 13 | 190.5 | FIG. 17 | 5 × 5 | 25 | 177.8 | 39.4 | 1.2 | 2nd end face side |
| Ex. 14 | 190.5 | FIG. 17 | 5 × 5 | 25 | 177.8 | 39.4 | 1.2 | 2nd end face side |
| Ex. 15 | 190.5 | FIG. 17 | 5 × 5 | 25 | 177.8 | 39.4 | 1.2 | 2nd end face side |

TABLE 2

| | bulges of honeycomb segment | | | | | Recesses of honeycomb segment | | |
| --- | --- | --- | --- | --- | --- | --- | --- | --- |
| | Length L2 of bulge in axial direction (mm) | Height H2 of bulges (mm) | Length W2 of bulges in width direction (mm) | Angle θ1 between imaginary bottom face and bent side face (°) | Shape of bulges | Length L4 of recess in axial direction (mm) | Depth H4 of recess (mm) | Length W4 of recess in width direction (mm) |
| Ex. 1 | 76.2 | 1.2 | 20 | 90 | quadrangle | 77.2 | 1.2 | 22 |
| Ex. 2 | 91 | 2.0 | 20 | 90 | quadrangle | 92 | 2.0 | 22 |
| Ex. 3 | 152.4 | 1.2 | 20 | 90 | quadrangle | 153.4 | 1.2 | 22 |
| Ex. 4 | 304.8 | 1.2 | 20 | 90 | quadrangle | 304.8 | 1.2 | 22 |
| Ex. 5 | 15 | 1.2 | 20 | 90 | quadrangle | 16 | 1.2 | 22 |
| Ex. 6 | 76.2 | 1.2 | 25 | 90 | quadrangle | 77.2 | 1.2 | 27 |
| Ex. 7 | 76.2 | 1.2 | 8 | 90 | quadrangle | 77.2 | 1.2 | 10 |
| Ex. 8 | 76.2 | 1.2 | 20 | 70 | trapezoid | 77.2 | 1.2 | 22 |
| Ex. 9 | 76.2 | 1.2 | 20 | 80 | triangle | 77.2 | 1.2 | 22 |
| Ex. 10 | 76.2 | 1.2 | 20 | 90 | semicircle | 77.2 | 1.2 | 22 |
| Ex. 11 | 45 | 3.0 | 20 | 90 | quadrangle | 45 | 2.5 | 22 |
| Ex. 12 | 45 | 4.0 | 20 | 90 | quadrangle | 45 | 4.0 | 22 |
| Ex. 13 | 45 | 3.0 | 20 | 70 | trapezoid | 45 | 2.5 | 22 |
| Ex. 14 | 45 | 3.0 | 20 | 80 | triangle | 45 | 2.5 | 22 |
| Ex. 15 | 45 | 3.0 | 20 | 90 | semicircle | 45 | 2.5 | 22 |

TABLE 3

| | L2/L1 (%) | L4/L3 (%) | W2/W1 (%) | W4/W3 (%) | H2/H1 (%) | Evaluations on progress of cracks at bonding part |
| --- | --- | --- | --- | --- | --- | --- |
| Ex. 1 | 25 | 25 | 51 | 56 | 120 | excellent |
| Ex. 2 | 30 | 30 | 51 | 56 | 200 | excellent |
| Ex. 3 | 50 | 50 | 51 | 56 | 120 | excellent |
| Ex. 4 | 100 | 100 | 51 | 56 | 120 | excellent |
| Ex. 5 | 5 | 5 | 51 | 56 | 120 | excellent |
| Ex. 6 | 25 | 25 | 63 | 69 | 120 | excellent |
| Ex. 7 | 25 | 25 | 20 | 25 | 120 | excellent |
| Ex. 8 | 25 | 25 | 51 | 56 | 120 | excellent |
| Ex. 9 | 25 | 25 | 51 | 56 | 120 | excellent |
| Ex. 10 | 25 | 25 | 51 | 56 | 120 | excellent |
| Ex. 11 | 25 | 25 | 51 | 56 | 210 | excellent |
| Ex. 12 | 25 | 25 | 51 | 56 | 333 | excellent |
| Ex. 13 | 25 | 25 | 51 | 56 | 210 | excellent |
| Ex. 14 | 25 | 25 | 51 | 56 | 210 | excellent |
| Ex. 15 | 25 | 25 | 51 | 56 | 210 | excellent |
| Ex. 16 | 25 | 25 | 51 | 56 | 120 | excellent |
| Ex. 17 | 25 | 25 | 25 | 30 | 120 | excellent |
| Ex. 18 | 25 | 25 | 51 | 56 | 120 | excellent |
| Ex. 19 | 25 | 25 | 51 | 56 | 120 | excellent |
| Ex. 20 | 25 | 25 | 38 | 43 | 120 | excellent |
| Ex. 21 | 25 | 25 | 5 | 10 | 120 | good |
| Ex. 22 | 3 | 3 | 51 | 56 | 120 | good |
| Ex. 23 | 25 | 25 | 51 | 56 | 40 | good |
| Comp. Ex. 1 | — | — | — | — | — | fail |
| Comp. Ex. 2 | 25 | 25 | 51 | 56 | 120 | fail |
| Comp. Ex. 3 | 25 | 25 | 51 | 56 | 120 | fail |

The manufactured honeycomb structure of Example 1 was performed "Evaluations on progress of cracks at the bonding part" by the following method. Table 3 shows the result.

(Evaluations on the Progress of Cracks at the Bonding Part)

Cold heat gas from 150° C. to 850° C. was repeatedly applied to the honeycomb structure. Physical vibrations were also applied at the same time by a vibration loading device, and after the test, the bonding layer of the honeycomb structure was checked about the progress of cracks. The vibration conditions of the vibration loading device were acceleration of 30 G and frequency of 100 Hz. The progress of cracks was checked by the following method. Ten honeycomb structures were manufactured for each of Examples and Comparative Examples, and the above-described test was conducted on these ten honeycomb structures for the evaluation. After the test, these ten honeycomb structures were visually observed and observed with CT about the generation and progress of cracks at the bonding layer in the range of 10 mm from the first end face in the cell extending direction and in the range of 10 mm from the second end face in the cell extending direction. When no cracks and progress of cracks were observed at the bonding layer in the range of 10 mm from either one of the end faces (that is, the first end face or the second end face), the honeycomb structure was determined as no progress of cracks.

Evaluation "excellent": No progress of cracks was observed in all of the ten honeycomb structures.

Evaluation "good": No progress of cracks was observed in seven or more of the ten honeycomb structures.

Evaluation "fail": Progress of cracks was observed in four or more of the ten honeycomb structures.

Examples 2 to 23

The honeycomb structures of Examples 2 to 23 were manufactured, in which the structure and the arrangement of the honeycomb segments are as in Table 1 or Table 4, and the structure of the bulges and the recesses of the honeycomb segments are as in Table 2 or Table 5. These honeycomb structures had structures similar to that of Example 1 other than the structure indicated in Table 1, Table 2, Table 3 and Table 4. The honeycomb structures of Examples 2 to 23 were also performed evaluation on progress of cracks at the bonding part by the method similar to that of Example 1. Table 3 shows the result.

TABLE 4

| | honeycomb structure | | | | honeycomb segment | | bonding layer | |
| --- | --- | --- | --- | --- | --- | --- | --- | --- |
| | diameter (mm) | Ref. FIG. | Arrangement | Total Number | Length L1, L3 in axial direction (mm) | Length W1, W3 in width direction (mm) | Max. thickness H1 of bonding layer (mm) | Starting point of bulges and recesses |
| Ex. 16 | 266.7 | FIG. 9 | 7 × 7 | 45 | 304.8 | 39.4 | 1 | 2nd end face side |
| Ex. 17 | 190.5 | FIG. 9 | 5 × 5 | 25 | 177.8 | 39.4 | 1 | 2nd end face side |
| Ex. 18 | 190.5 | FIG. 9 | 5 × 5 | 25 | 177.8 | 39.4 | 1 | 2nd end face side |
| Ex. 19 | 190.5 | FIG. 9 | 5 × 5 | 25 | 177.8 | 39.4 | 1 | 2nd end face side |
| Ex. 20 | 190.5 | FIG. 9 | 5 × 5 | 25 | 177.8 | 39.4 | 1 | 2nd end face side |
| Ex. 21 | 266.7 | FIG. 3 | 7 × 7 | 49 | 304.8 | 39.4 | 1 | 2nd end face side |
| Ex. 22 | 266.7 | FIG. 3 | 7 × 7 | 49 | 304.8 | 39.4 | 1 | 2nd end face side |
| Ex. 23 | 266.7 | FIG. 3 | 7 × 7 | 49 | 304.8 | 39.4 | 3 | 2nd end face side |
| Comp. Ex. 1 | 266.7 | — | 7 × 7 | 49 | 304.8 | 39.4 | 1 | no bulges and recesses |
| Comp. Ex. 2 | 266.7 | — | 7 × 7 | 49 | 304.8 | 39.4 | 1 | 20 mm from 2nd end face |
| Comp. Ex. 3 | 266.7 | — | 7 × 7 | 49 | 304.8 | 39.4 | 1 | 50 mm from 2nd end face |

TABLE 5

| | bulges of honeycomb segment | | | | | Recesses of honeycomb segment | | |
| --- | --- | --- | --- | --- | --- | --- | --- | --- |
| | Length L2 of bulge in axial direction (mm) | Height H2 of bulges (mm) | Length W2 of bulges in width direction (mm) | Angle θ1 between imaginary bottom face and bent side face (°) | Shape of bulges | Length L4 of recess in axial direction (mm) | Depth H4 of recess (mm) | Length W4 of recess in width direction (mm) |
| Ex. 16 | 76.2 | 1.2 | 20 | 90 | quadrangle | 76.2 | 1.2 | 22 |
| Ex. 17 | 45 | 1.2 | 10 | 90 | quadrangle | 46 | 1.2 | 12 |
| Ex. 18 | 45 | 1.2 | 20 | 70 | trapezoid | 46 | 1.2 | 22 |
| Ex. 19 | 45 | 1.2 | 20 | 80 | triangle | 46 | 1.2 | 22 |
| Ex. 20 | 45 | 1.2 | 15 | 90 | semicircle | 46 | 1.2 | 17 |
| Ex. 21 | 76.2 | 1.2 | 2 | 90 | quadrangle | 77.2 | 1.2 | 4 |
| Ex. 22 | 9 | 1.2 | 20 | 90 | quadrangle | 10 | 1.2 | 22 |
| Ex. 23 | 76.2 | 1.2 | 20 | 90 | quadrangle | 77.2 | 1.2 | 22 |
| Comp. Ex. 1 | — | — | — | — | — | — | — | — |
| Comp. Ex. 2 | 76.2 | 1.2 | 20 | 90 | quadrangle | 77.2 | 1.2 | 22 |
| Comp. Ex. 3 | 76.2 | 1.2 | 20 | 90 | quadrangle | 77.2 | 1.2 | 22 |

Comparative Examples 1 to 3

The honeycomb structures of Comparative Examples 1 to 3 were manufactured, in which the structure and the arrangement of the honeycomb segments are as in Table 4. The honeycomb segments of Comparative Example 1 did not have bulges and recesses on the side faces of the honeycomb segments, and each of the manufactured forty nine honeycomb segments had flat side faces of the quadrangular prism shaped segment. Then, these forty nine honeycomb segments were combined in a grid pattern via the bonding paste to manufacture an assembled member of the honeycomb segments, and after that, the honeycomb structure was manufactured by a method similar to that of Example 1. For Comparative Examples 2 and 3, forty nine honeycomb segments were produced such that the starting points in the axial direction of the bulges and recesses of the honeycomb segments were 20 mm or 50 mm from the second end face. Table 5 shows the structure of the bulges and recesses in Comparative Examples 2 and 3. Then, these forty nine honeycomb segments were combined in a grid pattern via the bonding paste to manufacture an assembled member of the honeycomb segments, and after that, the honeycomb structure was manufactured by a method similar to that of Example 1. The honeycomb structures of Comparative Examples 1 to 3 were also performed evaluation on progress of cracks at the bonding part by the method similar to that of Example 1. Table 3 shows the result.

(Results)

The honeycomb structures of Examples 1 to 23 had favorable results for the evaluation on progress of cracks at the bonding part. Especially the honeycomb structures of Examples 1 to 20 showed no progress of cracks in all of their ten honeycomb structures. In the evaluation on the progress of cracks at the bonding part, no cracks were observed at the end face side where the bulge or the recess started of the first end face and the second end face of the honeycomb structure. On the other hand, the honeycomb structures of Comparative Examples 1 to 3 had the evaluation results inferior to those of the honeycomb structures of Examples 1 to 23 about the evaluation on progress of cracks at the bonding part.

The honeycomb structure of the present invention can be used for a purifying member to purify exhaust gas.

DESCRIPTION OF REFERENCE NUMERALS

1: partition wall, 2: cell, 3, 23, 43, 83: segment outer wall, 4, 24, 44, 64, 84, 94: honeycomb segment, 4a, 44a, 84a: honeycomb segment (one honeycomb segment), 4b, 44b, 84b: honeycomb segment (another honeycomb segment), 5: plugging portion, 7, 27, 47, 67, 87, 97: bulge, 8, 28, 48, 68, 88, 98: recess, 10, 30, 90: honeycomb segment bonded member, 11: first end face, 12: second end face, 13: circumferential wall, 14: bonding layer, 15: bent side face, 16: base part (base part of bulge), 17: imaginary bottom face, 100, 200, 300: honeycomb structure, H1: maximum thickness of bonding layer, H2: bulging height of bulge, H4: depth of recess, L1: length of one honeycomb segment in the axial direction, L2: length of bulge in the axial direction, L3: length of another honeycomb segment in the axial direction, L4: length of recess in the axial direction, W1: length of one honeycomb segment in the width direction, W2: length of bulge in the width direction, W3: length of another honeycomb segment in the width direction, W4: length of recess in the width direction, $\theta 1$: angle between imaginary bottom face and bent side face of the bulge

What is claimed is:

1. A honeycomb structure comprising a honeycomb segment bonded member including; a plurality of prismatic columnar shaped honeycomb segments; and a bonding layer mutually bonding side faces of the plurality of honeycomb segments, wherein
   the honeycomb segments have a porous partition wall disposed so as to surround a plurality of cells extending from a first end face as an inlet side of fluid to a second end face as an outlet side of the fluid; and a segment outer wall defining side faces of the honeycomb segment,
   one honeycomb segment out of the plurality of honeycomb segments has at least one bulge that bulges outward on one side face of the one honeycomb segment,
   the at least one bulge is provided so as to start from either the first end face or the second end face in an axial direction from the first end face to the second end face of the one honeycomb segment and extend in the axial direction,
   another honeycomb segment out of the plurality of honeycomb segments has at least one recess that is recessed inward on one side face of the another honeycomb segment,
   the at least one recess is provided so as to start from either the first end face or the second end face in an axial direction from the first end face to the second end face of the another honeycomb segment and extend in the axial direction,
   in the honeycomb segment bonded member, the one honeycomb segment and the another honeycomb segment are disposed adjacent to each other so that their one side faces are opposed to each other, and bonded to each other via the bonding layer with the bulge of the one honeycomb segment inserted in the recess of the another honeycomb segment,
   length W2 of the bulge in a width direction orthogonal to the axial direction and a bulging height direction of the bulge is smaller than length W1 of the one side face of the one honeycomb segment in the width direction,
   length W4 of the recess in a width direction orthogonal to the axial direction and a recessing direction of the recess is smaller than length W3 of the one side face of the another honeycomb segment in the width direction,
   a base part in the bulging height direction of the bulge is defined with a bent side face that is bent from a flat portion of the one side face,
   angle $\theta 1$ formed between an imaginary bottom face of the bulge, which includes a plane imaginarily extending from the flat portion of the one side face, and the bent side face of the bulge being 60° or more;
   wherein length W2 of the bulge in the width direction is 20 to 70% of length W1 of the one side face of the one honeycomb segment in the width direction, and length W4 of the recess in the width direction is 20 to 70% length W3 of the one side face of the another honeycomb segment in the width direction.

2. The honeycomb structure according to claim 1, wherein the bulge of the one honeycomb segment has bulging height H2 that bulges from the one side face of the bulge, and the bulging height H2 is larger than a maximum thickness H1 of the bonding layer between the one side faces of the one honeycomb segment and the another honeycomb segment.

3. The honeycomb structure according to claim 1, wherein the recess of the another honeycomb segment has a depth H4 of the recess, and the depth H4 is smaller than a thickness of the segment outer wall defining the side faces of the another honeycomb segment, so that the recess does not penetrate through the segment outer wall.

4. The honeycomb structure according to claim 1, wherein length L2 of the bulge in the axial direction is 5 to 50% of length L1 of the one honeycomb segment in the axial direction, and length L4 of the recess in the axial direction is 5 to 50% of length L3 of the another honeycomb segment in the axial direction.

\* \* \* \* \*